US007641754B1

(12) United States Patent
Hui

(10) Patent No.: US 7,641,754 B1
(45) Date of Patent: Jan. 5, 2010

(54) REINFORCER RELOADER SYSTEM FOR HOLE PUNCHER

(76) Inventor: John Hui, 5 Hutton Centre Dr., Suite 830, Santa Ana, CA (US) 92707

( * ) Notice: Subject to any disclaimer, the term of this patent is extended or adjusted under 35 U.S.C. 154(b) by 636 days.

(21) Appl. No.: 11/490,420

(22) Filed: Jul. 19, 2006

(51) Int. Cl.
*B32B 38/04* (2006.01)
*B32B 37/18* (2006.01)
*B32B 37/12* (2006.01)
*B32B 37/16* (2006.01)

(52) U.S. Cl. ....................... 156/256; 156/513; 156/514; 156/250; 156/261; 156/556; 156/563; 156/564; 156/573

(58) Field of Classification Search ................. 156/250, 156/256, 261, 513, 514, 553, 556, 564, 573; 221/30, 151, 303, 306
See application file for complete search history.

(56) References Cited

U.S. PATENT DOCUMENTS 4,746,394 A 5/1988 Sueta et al.
4,909,893 A * 3/1990 Lee ............................ 156/513
5,199,601 A * 4/1993 Roethel ....................... 221/310
5,287,797 A * 2/1994 Grykiewicz et al. ........... 99/295
6,206,070 B1 3/2001 Salmon
6,789,593 B1 9/2004 Hui
7,318,465 B1 * 1/2008 Hui ............................ 156/540
2008/0314526 A1 * 12/2008 Hui ............................ 156/510

FOREIGN PATENT DOCUMENTS

CN 03114304.0 4/2003
JP 11-138498 5/1999

* cited by examiner

*Primary Examiner*—Mark A Osele
*Assistant Examiner*—Christopher C Caillouet
(74) *Attorney, Agent, or Firm*—Cislo & Thomas, LLP

(57) ABSTRACT

A reinforcing ring loading and confining apparatus is provide for a hole punching and sheet material reinforcing device and includes a reinforcer loader receptacle that accommodates a plurality of annular reinforcing rings. The reinforcer loader has a body portion with a floor and a cylindrical reinforcer guide, open at the top and bottom, projecting up from the floor. A removable bottom panel is mounted to the body portion beneath the floor in alignment with the cylindrical guide. The reinforcer loader is inserted into the reinforcer loader receptacle support so that the loaded stack of reinforcing rings are positioned upon the removable bottom panel directly beneath the punching ram. The punching ram is forced downwardly through the stack of reinforcing rings and has an enlarged punching tip that passes through the central apertures in the reinforcing rings. When retracted, the punching tip lifts the stack of reinforcing rings back upwardly, thereby transferring them onto the punching ram shank. The stack of reinforcing rings is thereby loaded. The removable bottom panel is removed and the reinforcing rings are thereafter applied to a sheet of material while concurrently punching holes in the sheet of material.

10 Claims, 9 Drawing Sheets

REINFORCER RELOADER SYSTEM FOR HOLE PUNCHER

BACKGROUND OF THE INVENTION

1. Field of the Invention

The present invention relates to a loading system for a combination hole puncher and reinforcer of the type used in punching holes in sheets of material, such as paper, and for concurrently reinforcing the holes with flat, annular rings around the holes.

2. Description of the Prior Art

In offices throughout the world hole punching devices have been utilized for many years to punch holes in sheets of paper, and sometimes plastic sheets, in order to allow those sheets to be secured in files. Sheets of paper are often punched at the top with a pair of holes that allow them to be secured at the top of files using pronged fasteners. Other types of hole punchers are used to punch holes in papers and other sheets of material along the side margin to allow them to be secured in ring binders or in binders with other attachment devices.

A problem that has persisted through the years is that considerable stress is often applied to the structure of papers fastened in files in the area immediately surrounding the punched holes. The papers then tear through the short distance of material between the holes and the edges of the sheets of paper near which they are formed. When this occurs the sheets will no longer remain in the file.

One system that has been available for many years for remedying this situation is the use of flat, annular reinforcing rings that may be secured to the areas surrounding the punched holes. These reinforcing rings are typically formed of a material of greater strength than the paper or other sheet material in which the holes are punched. The reinforcing rings are coated with either a moisture-sensitive or pressure-sensitive adhesive and are applied to the sheet of paper or other material about holes formed therein once the holes have been punched.

The principal problem with this prior arrangement is that it has historically been performed manually. The task of reinforcing punched holes in the hundreds, and even thousands, of sheets of papers that are secured in files by the manual application of such reinforcing rings is often so labor intensive as to be impractical. Consequently, this system of reinforcement, while used to some extent, is not prevalent.

Various hole puncher and reinforcer devices have been created in attempts to provide alternative, more automated ways of reinforcing the structure of sheets of paper around punched holes therein. Numerous machines have been fabricated that draw segments of adhesive tape from rolls and secure them to sheets of paper or plastic contemporaneously with the perforation of those sheets. When such devices operate properly, the sheets of paper are provided with short sections of tape at the edges of the papers in which the holes are formed. Holes are punched through both the segments of tape and the underlying paper or other sheet material. One recurring problem in such devices is that some of the pressure-sensitive adhesive from the tape transfers to the tape feed and punching mechanisms. This leads to fouling and jamming of the tape advancement and punch apparatus.

An improved hole punching and reinforcing machine was developed and is described in U.S. Pat. No. 6,789,593 issued Sep. 14, 2004 and hereby incorporated by reference in its entirety. This improved system involves a hole puncher and reinforcer device that automatically applies a reinforcement about a hole that is punched in a sheet of material, but which avoids the use of adhesive tape drawn from a roll for this purpose. As a consequence, this advanced hole puncher and reinforcer avoids the problem of fouling of a feed system with adhesive transferred to the operating mechanism from a roll of tape.

A further feature of this advanced system is that it is extremely simple in construction. Unlike prior combination hole punchers and reinforcers, the advanced system does not require any elaborate, relatively complex, and expensive tape feed mechanisms. To the contrary, the only mechanism that is required for applying reinforcement about the circumference of the holes as they are punched through the sheet material is a die punch upon which the flat reinforcing rings are stacked one atop another between a broadened punching tip located at the lower extremity of the die punch shank and a pressure plate located above the stack of reinforcing rings.

Despite its advantages, however, the hole puncher and reinforcer of this advanced prior system does have certain disadvantages. Specifically, once all of the reinforcing rings have been dispensed they must be replaced with a new stack of reinforcing rings. This involves stringing the replacement rings onto the lower portion of the punch. This is a very tedious and time-consuming process.

A further refinement of this system greatly facilitated the provision of a new supply of reinforcing rings to a hole puncher and reinforcer. According to this refinement a replaceable cartridge is provided having its own punch plate and a punch rod and fully loaded with a fresh stack of reinforcing rings mounted upon the punch rod. The cartridge also contains a spring mechanism for biasing the punch rod toward a retracted position within the cartridge casing.

When all of the reinforcing rings have been used up from one cartridge, the spent cartridge, including the punch plate, punch rod, and spring thereon, is removed from the operating mechanism of the hole puncher and reinforcer. This refinement is described in U.S. patent application Ser. No. 09/937,694, filed Sep. 10, 2004, hereby incorporated by reference in its entirety. A fresh cartridge with a full load of reinforcing rings mounted on a different punch rod is then slipped into position in the frame of the hole puncher and reinforcer. The use of a preloaded cartridge avoids the necessity for reloading the punch with a new supply of reinforcing rings since the supply of replacement rings is already preloaded onto a different punch within the new cartridge. As the supply of reinforcing rings of each cartridge is used up, the entire spent cartridge is easily removed and quickly replaced.

One problem with this refinement is that each cartridge requires a disposable punch and spring mechanism, as well as a surrounding plastic case, all of which are disposable. In a consumable office supply product the added expense of a disposable punch, springs, and surrounding case of each cartridge results in an economic disadvantage in the use of this product. That is, a replacement cartridge involves not only the cost of the reinforcing rings, but also the cost of the casing, spring, and punch, all of which are discarded once all of the reinforcing rings have been used up.

SUMMARY OF THE INVENTION

The present invention provides a system for loading a stack of reinforcing rings into a combination hole puncher and reinforcer which avoids the expense of a disposable plastic housing, a disposable punch, and a disposable spring. To the contrary, the reinforcing ring loading system of the present invention provides a reusable reinforcer loader that receives a stack of reinforcing rings therewithin and which allows a stack of reinforcing rings to be loaded onto the shank of a permanent, reusable punch very simply and easily. Loading of an entire stack of reinforcing rings onto the shank of the punching ram is accomplished with a single cycle of advancement and retraction of the punching ram.

In one broad aspect the present invention is a reinforcing ring loading and confining apparatus for a hole punching and sheet material reinforcing device. The reinforcing ring loading and confining apparatus is comprised of a reinforcer loader having a body portion with a floor and cylindrical reinforcer guide having an open top and an open bottom and which rises upwardly from the floor. A removable bottom panel is mounted to the body portion beneath the floor and beneath the open bottom of the reinforcer guide. As a result the cylindrical reinforcer guide receives therewithin a plurality of annular reinforcing rings, each having an upper surface with a release coating thereon and an undersurface with a pressure-sensitive adhesive coating thereon. Each of the reinforcing rings has a central opening therein of a first inner diameter and the upper and lower surfaces of each reinforcing ring extend to a larger peripheral outer diameter. The annular reinforcing rings are arranged in a stack with the central openings therein in congruent vertical alignment with each other. The stack of reinforcing rings is disposed in the reinforcer guide and is supported from beneath by the removable bottom panel.

The removable bottom panel preferably has a central opening therethrough coaxially aligned with the first inner diameter of the central openings in the reinforcing rings. Also, the central opening in the removable bottom panel is preferably a circular opening with a plurality of slits radiating therefrom. Projections preferably depend from the underside of the removable bottom panel and are located beyond the radial slits therein.

The removable bottom panel preferably has a pair of mutually parallel side edges and a forwardly projecting pull tab. The floor of the body portion preferably has a pair of mutually parallel, laterally spaced ledges for supporting the side edges of the removable bottom panel from beneath. In this way the removable bottom panel is disposed in sliding engagement with the laterally spaced ledges on the underside of the floor of the body portion.

In another broad aspect the invention may be considered to be an improvement in a combination hole puncher and sheet material reinforcer machine for punching holes in sheets of material while concurrently attaching annular reinforcing rings thereto. The machine employs a punching ram that includes a shank with an annular pressure plate secured thereto and a punching tip having a greater cross-sectional area than the shank. A deck is located beneath the ram and has an aperture therethrough coaxially aligned with the punching ram. The punching ram is thereby movable in a direction perpendicular to the deck between a retracted position remote therefrom and a punching position with the punching tip projecting through the aperture in the deck.

According to the improvement of the invention a reinforcer loader support is mounted above the deck of the machine in spaced separation therefrom. The reinforcer loader support defines a loading hatch therein larger in cross-sectional area than the annular reinforcing rings to be applied to the sheet material. The loading hatch surrounds the punching ram and the reinforcing ring support defines a reinforcer loader receptacle.

The improvement o the invention is further comprised of a reinforcer loader that includes a body portion and a reinforcing ring support. The body portion fits into the reinforcer loader receptacle and has a floor and a reinforcer guide cylinder open at both its top and bottom. The reinforcer guide cylinder projects up from the reinforcer loader floor. The reinforcing ring support is mounted directly beneath the reinforcer loader floor below the open bottom of the reinforcer guide cylinder. The reinforcing ring support is movable from beneath the floor of the body portion of the reinforcer loader.

A plurality of annular reinforcer rings are provided. Each reinforcing ring has a center opening smaller in cross-sectional area than the punching tip of the punching ram. The reinforcing rings are stacked atop each other in mutual vertical alignment. The stack of reinforcing rings is initially seated atop the reinforcing ring support and is laterally confined within the reinforcer guide cylinder.

The reinforcing ring support has a central opening therethrough coaxially aligned with the punching ram. This central opening is circular with a plural of radial slits emanating therefrom. The reinforcing ring support has a plurality of protrusions depending from its underside and located beyond the radial slits.

The reinforcing ring support has a relatively broad, rectangular portion with a pair of mutually parallel side edges and a forwardly projecting pull tab. The floor beneath the body portion has a pair of laterally spaced ledges for supporting the reinforcing ring support from beneath. In this way the movable reinforcing ring support is disposed in sliding engagement with the laterally spaced ledges.

The reinforcer loader support is comprised of a forwardly projecting shelf with a pair of spaced apart, outwardly projecting, elongated ears depending therefrom. The reinforcer loader has upright side walls terminating in laterally directed flanges projecting toward each other. The flanges reside in sliding engagement atop the elongated ears. The flanges thereby slidably engage the ears for movement in a fore and aft direction to allow the reinforcer loader to slide forward for detachment from the reinforcer loader support and alternatively, to slide rearward into engagement with the reinforcer loader support with the loading hatch centered beneath the punching ram.

The reinforcer loader support is preferably secured relative to and extends upwardly from the deck of the machine. The combination is further comprised of a punch mounting tower located rearwardly from the reinforcer loader support. The punch mounting tower includes a pair of upright standards or stanchions with a punch guide disposed therebetween. The punch guide defines a punch guide path of punching ram travel oriented perpendicular to the deck and through the loading hatch.

A bell crank mechanism is mounted to the punch mounting tower at a bell crank mounting hinge connection that is located rearwardly from the punch guide. The bell crank mechanism has a punch hinge connection to the shank of the punching ram. The punch hinge connection is located directly above the punch guide. The bell crank mechanism has an operating arm hinge connection located rearwardly from the punch hinge connection and forwardly from the mounting hinge connection.

An operating arm is coupled to the punch mounting tower at an operating arm mounting hinge connection located forwardly of the punching ram. The operating arm extends upwardly and rearwardly from the operating arm mounting hinge connection. The operating arm is coupled to the bell crank mechanism at the operating arm hinge connection. A spring biasing mechanism urges the punching ram upwardly and away from the deck.

In still another aspect the invention may be considered to be a method of loading a combination hole punching and sheet material reinforcing machine that has a punching ram for punching holes in sheet material. The punching ram includes a shank with an annular pressure plate secured thereto and a punching tip with a greater cross-sectional area than the shank.

A reinforcer loader is utilized that has a body portion with a floor and a cylindrical reinforcer guide having an open top and an open bottom. The cylindrical reinforcer guide rises from floor of the body portion. A removable bottom panel is mounted to the body portion beneath the floor and beneath the open bottom of the reinforcer guide. The bottom panel defines a central, circular opening therethrough slightly larger in diameter than the outer peripheral diameter of the reinforcing rings.

The steps of the method of the invention involve inserting into the top of the cylindrical reinforcer guide a stack of vertically aligned reinforcing rings, each having an upper surface with a release coating thereon and an undersurface with a pressure-sensitive adhesive coating thereon. The stack of annular reinforcing rings is supported by the bottom panel of the reinforcer loader. The reinforcer loader is positioned in the hole punching and sheet material reinforcing machine directly beneath the punching ram. The punching ram is operated by pushing it downwardly and through the stack of reinforcing rings so that the punching tip passes through the central opening in the bottom panel. The punching ram is retracted upwardly, thereby carrying the stack of reinforcing rings upwardly. The reinforcing rings are thereby disposed about the shank of the punching ram and atop the punching tip. The bottom panel is then removed from the body portion of the reinforcer loader so that the hole punching and sheet reinforcing machine can thereafter be used to concurrently punch holes in sheet material and apply the reinforcing rings about the punched holes in the sheet material. Once the stack of reinforcing rings has been depleted from the shank of the punching ram, the reinforcing ring loading and confining apparatus is removed, the removable bottom panel is reinserted, and a new stack of reinforcing rings is reloaded.

The bottom panel is preferably provided with a tab projecting forwardly and away from the central opening therein. Removal of the bottom panel is thereby performed by pulling the tab forwardly to pull the bottom panel completely free from the reinforcer loader.

The hole punching and sheet material reinforcing machine is preferably equipped with a reinforcer loader support aligned with the punching ram. The reinforcer loader support includes mutually parallel ears located on opposite sides of the punching ram and projecting forwardly therefrom. The reinforcer loader is provided with mutually parallel flanges configured to cooperate with the ears in sliding engagement therewith. The reinforcer loader is thereby positioned in the hole punching and sheet material reinforcing machine by engaging the flanges with the ears and sliding the reinforcer loader rearwardly to a location directly beneath the punching ram.

The invention may be described with greater clarity and particularity by reference to the accompanying drawings.

DESCRIPTION OF THE EMBODIMENT

Figure 1:
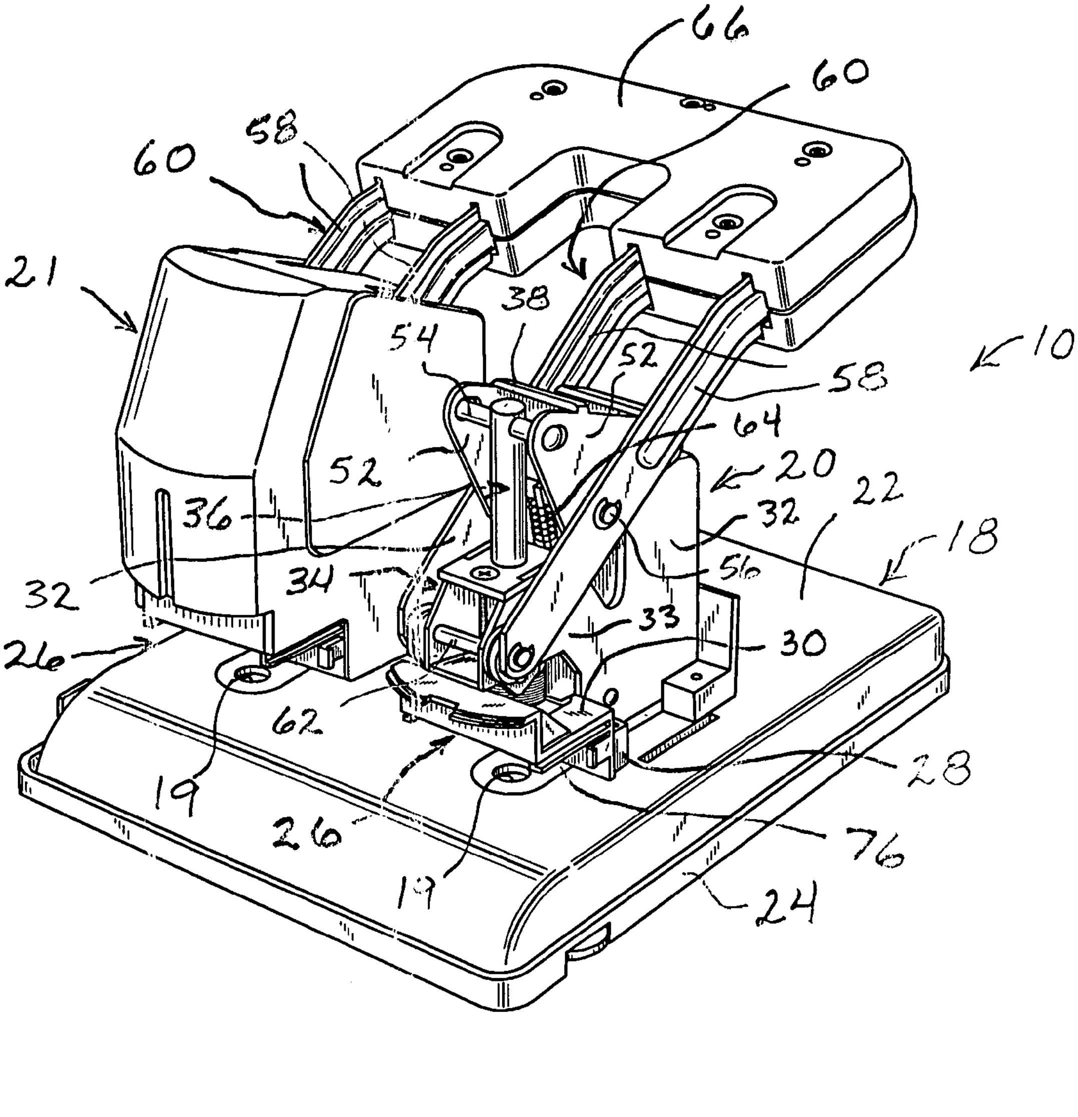
FIG. 1 is a perspective view of a combination hole punching and sheet material reinforcer machine constructed according to the present invention with one of the covers for one of the punching towers removed for clarity of illustration of the operating mechanism.
Figure 2:
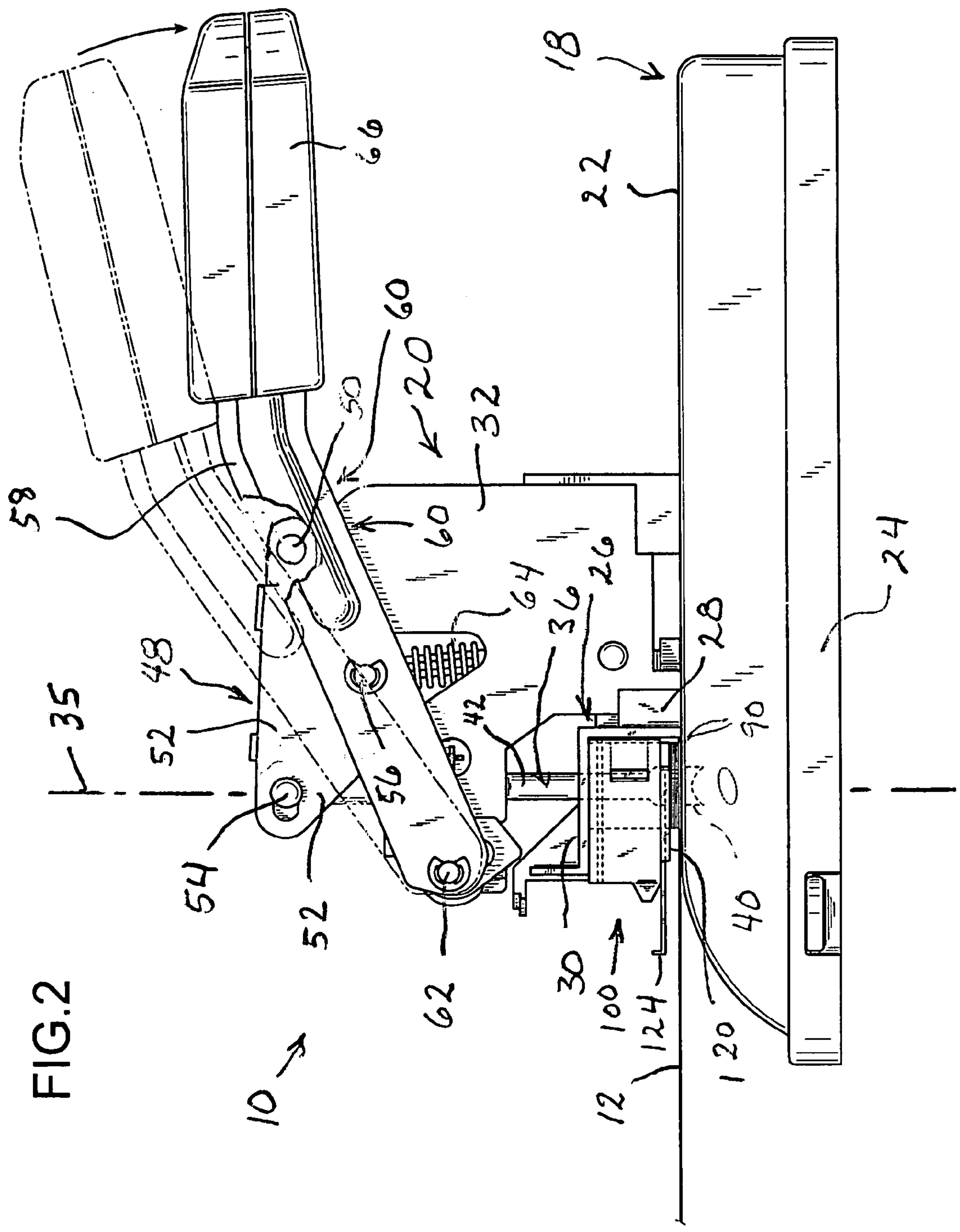
FIG. 2 is a right side elevational view thereof, partially broken away.

FIGS. 1 and 2 illustrate a combination hole puncher and sheet material reinforcer machine 10 constructed according to the invention. The hole puncher and reinforcer 10 is operable to punch holes, such as the hole 13 indicated in FIG. 11, in sheets of material, such as the sheet of paper 12 indicated in FIGS. 10 and 11. While the hole puncher and reinforcer 10 could employ a single punch mechanism, more typically it will be constructed to concurrently punch and reinforce a plurality of holes. For example, the hole puncher and reinforcer 10 may have a plastic and/or metal framework suitable for concurrently punching three holes along one side of the sheet of paper 12. In such an embodiment the framework of the hole puncher and reinforcer would be provided with three identical punching rams mounted atop a horizontal base. Alternatively, and as illustrated in FIGS. 1 and 2, the hole puncher and reinforcer 10 of the invention may be designed to top punch sheets of paper and may have a pair of identical upright stanchions or towers, indicated at 20, both of which are normally covered with a plastic shroud or canopy 21 of the type illustrated on the left side in FIG. 1. The shroud or cover 21 is removed from the right-hand tower 20 in that drawing figure to allow the operating mechanism thereof to be more clearly illustrated.

The two towers 20 are mounted side by side atop a base 18 to project vertically upwardly therefrom. The base 18 is of the conventional type having a flat upper deck 22 elevated above a removable chad receptacle tray 24.

A reinforcer loader support 26 is mounted above the deck 22 in spaced separation therefrom by a support structure 28 that is anchored to the deck 22, preferably by screws. The reinforcer loader support 26 has a shelf portion 30 that extends horizontally forwardly from the tower 20 with which it is associated, preferably at a distance of between about 1.2 and 1.5 centimeters above the horizontal deck 22. As used herein, the direction "forward" or "forwardly" refers to the direction from which a sheet of paper 12 is inserted into the machine 10 and is indicated by the directional arrow 31 in FIG. 9. The direction "rearward" or "rearwardly" refers to the direction opposite the direction 31. Both the shelf portion 30 of the reinforcer loader support 26 and the flat deck 22 reside in mutually parallel relationship relative to each other.

There are two reinforcer loader supports 26 in the combination hole puncher and sheet material reinforcer machine 10 of the embodiment illustrated, one for each of the towers 20. A punch mounting tower 20 is located rearwardly from each of the reinforcer loader supports 26. Each of the towers 20 includes a pair of upright metal stanchions or standards 32, which are flat, vertically oriented, mutually parallel steel plates that are anchored relative to the machine base 18 so as to extend vertically upright therefrom. The standards 32 have forwardly projecting flanges 33 joined and immobilized relative to each other by a punch guide 34 formed with a pair of flat, horizontally disposed, upper and lower plates having central, circular, mutually coaxially aligned apertures defined therethrough. The apertures in the horizontal punch guide plates thereby define a vertical punch ram path that is oriented perpendicular to the deck 22 and which is indicated by the punch axis of alignment 35 in FIG. 2.

Figure 9:
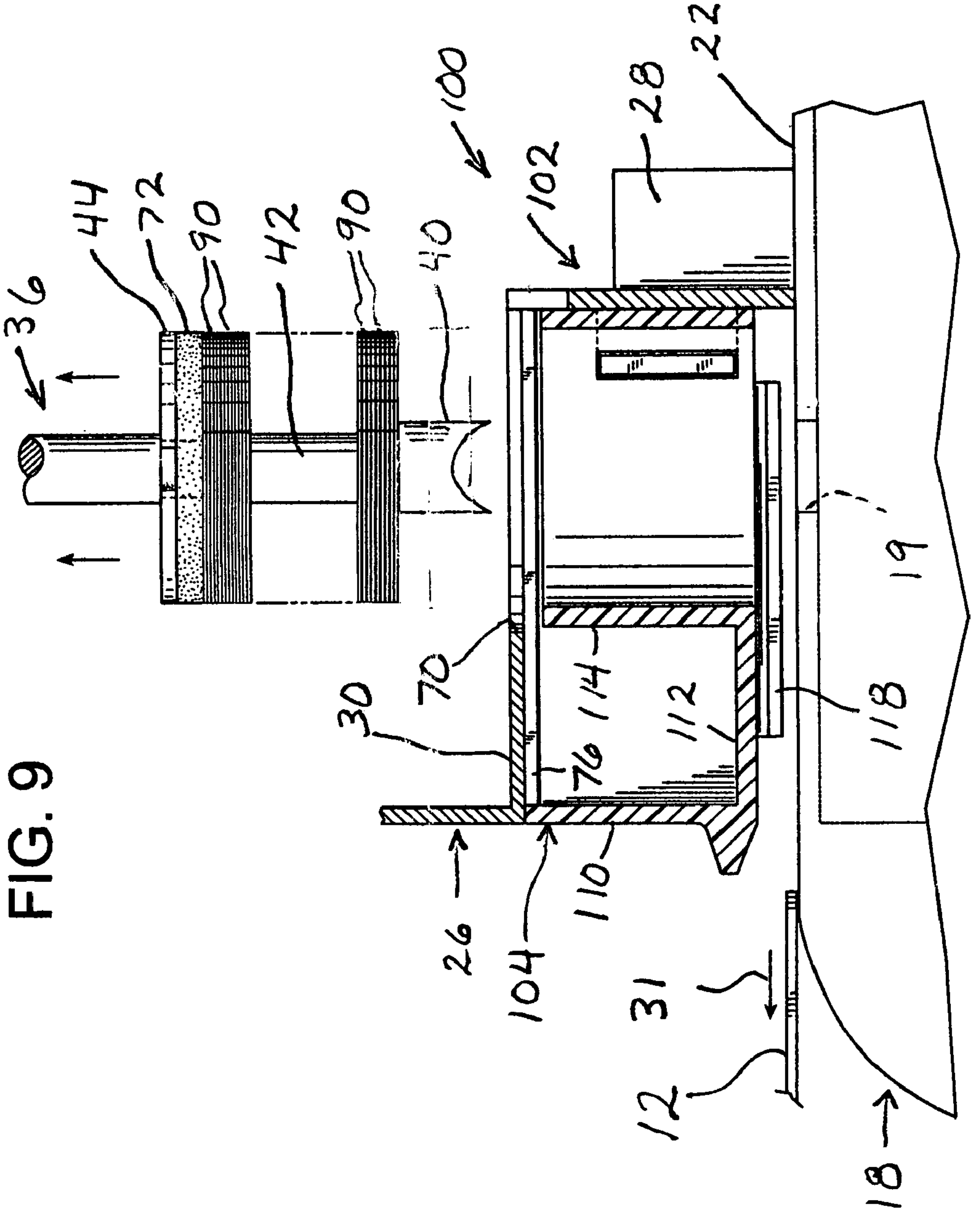
FIG. 9 illustrates retraction of the punching ram and withdrawal of the removable bottom panel following loading of the stack of reinforcing rings onto the punching ram.
Figure 10:
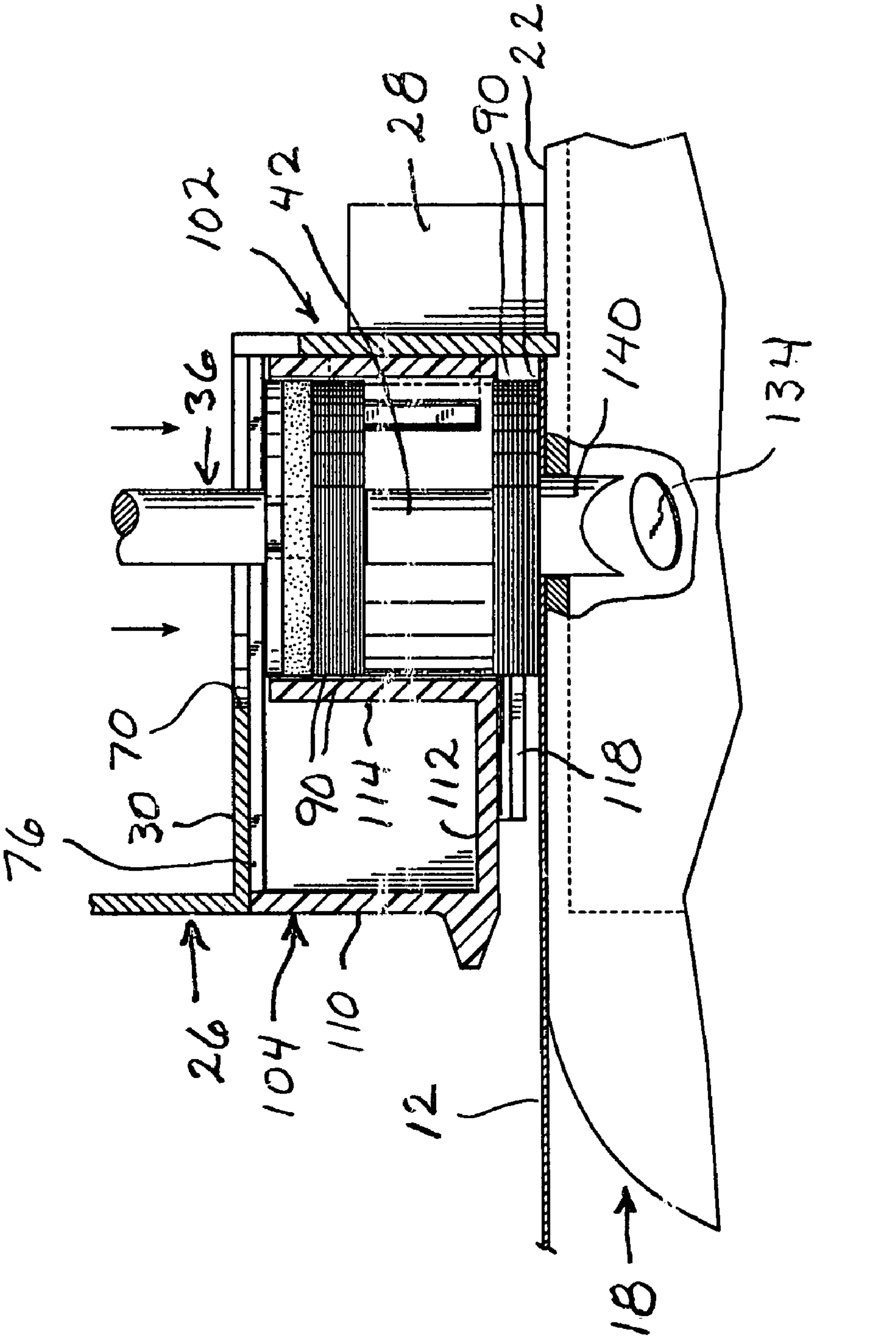
FIG. 10 is a side sectional elevational view illustrating subsequent concurrent punching of a sheet of material and application of one of the reinforcing rings from the stack loaded on the punching ram.
Figure 11:
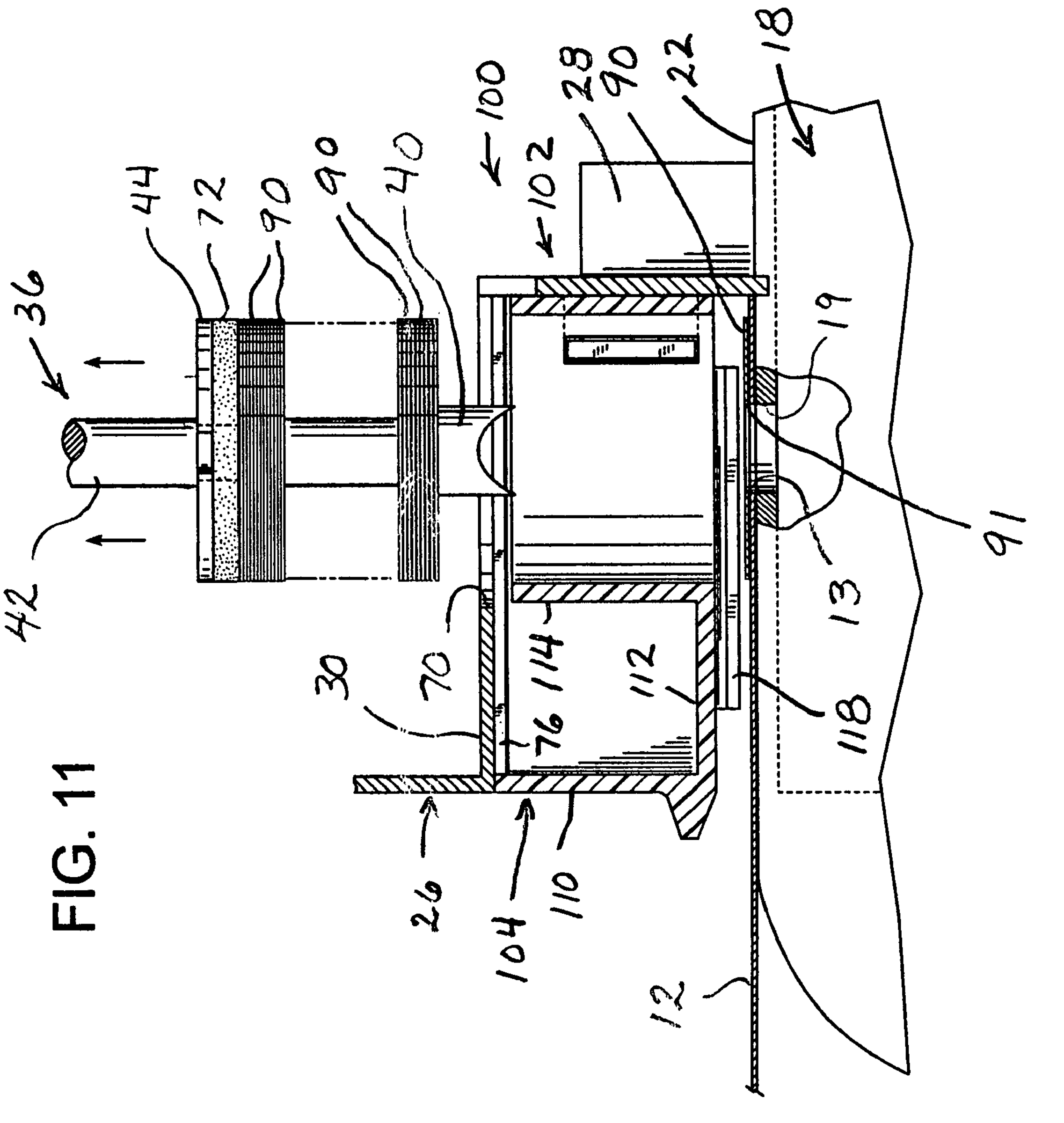
FIG. 11 illustrates retraction of the punching ram following punching and application of a reinforcing ring to the sheet of material.

Each of the towers 20 carries a generally cylindrical punching ram 36 having an upper end 38 and an opposite lower end which is formed into a punching tip 40. The punching ram 36 is movable in a direction perpendicular to the deck 22 between a retracted position remote therefrom, as illustrated in FIGS. 9 and 11, and a punching position with the punching tip 40 projecting through the aperture 19 in the deck 22. In the punching position illustrated in FIG. 10 the punching tip 40 projects through the aperture 19 in the deck 22 and below the upper surface of the deck 22.

The punching ram 36 includes a shank 42 formed as a solid metal, cylindrical rod with a C-clip that serves as pressure plate 44 secured thereto. The punching tip 40 also has a cylindrical shape and a greater cross-sectional cylindrical area than the shank 42. The transition between the punching tip 40 and the shank 42 is shaped as an upwardly and outwardly facing frustoconical surface forming a shoulder 46 which is most clearly illustrated in FIG. 7. The punching aperture 19 through the deck 22 in the base 18 is coaxially aligned with the punching ram 36 and is just slightly greater in diameter than the punching tip 40.

As illustrated in FIGS. 1 and 2, a bell crank mechanism 48 is mounted to each punch mounting tower 20. Each bell crank mechanism 48 is formed of a pair of flat, mutually parallel, generally triangular-shaped plates 52. Bell crank mounting hinge pins 50 join the rear corners of the plates 52 of each bell crank mechanism 48 to the tops of the upright standards 32. Together the bell crank mounting pins 50 form a bell crank mounting hinge connection for each tower 20. The bell crank mounting hinge connection formed by the mounting pins 50 for each bell crank mechanism 48 on each tower 20 is located rearwardly from the punch guide 34.

A horizontally disposed punching ram hinge pin 54 extends between the forward flanges 33 of the two bell crank plates 52 for each bell crank mechanism 48. Each hinge pin 54 extends through a transverse aperture defined through the upper end 38 of its associated punching ram 36. The rotatable coupling formed between the hinge pin 54 and the forwardly projecting flanges 33 of the bell crank plate 52 forms a punch hinge connection to the upper end 38 of the punching ram 36 that is located directly above the horizontally disposed apertures defined through the plates of the punch guide 34.

Another horizontally disposed hinge pin 56 extends transversely through the lower corners of the bell crank plates 52 and through a pair of elongated, metal operating arm levers 58 located on each side of each tower 20. The operating arm hinge connections formed by the pivot pins 56 are located rearwardly from the punch hinge connection pin 54 and forwardly from the mounting hinge connection pins 50.

Together the operating arm levers 58 form an operating arm 60 that is coupled to the punch mounting tower 20 at an operating arm mounting hinge connection formed by a pivot pin 62 which is located forwardly of the punching ram 36. The operating arm levers 58 extend upwardly and rearwardly from the mounting hinge connection pin 62 and are coupled to the outside of the plates 52 of the bell crank mechanism 48 at the operating arm hinge connection pin 56. A spring biasing mechanism, which in the embodiment illustrated is a coil spring 64 under compression, urges the punching ram 36 upwardly and away from the deck 22 to its retracted position. The compressed spring 64 forces the operating arm lever links 58 upwardly and away from the deck 22 in a counterclockwise direction, as viewed in FIG. 2. The operating arm lever links 58 of the operating arms 60 for both of the towers 20 are joined together by a generally U-shaped plastic or metal handle 66, so that the punching rams 36 are operated in unison.

As is evident in FIGS. 1 and 2, downward pressure on the U-shaped handle 66 rotates each of the operating arms 60 in a clockwise direction, overcoming the bias of the spring 64 and compressing it further. The downward rotation of the operating arms 60 in a clockwise direction, as viewed in FIG. 2, forces each punching ram 36 from its retracted position, illustrated in FIG. 11, to its punching position, illustrated in FIGS. 8 and 10.

A relatively large loading hatch 70 of generally semicircular shape is defined in the shelf portion 30 of the reinforcer loader support 26. The loading hatch 70 surrounds the punching ram 36 and defines an open area greater than the annular, outer periphery of the disc-shaped reinforcing rings 90 that are mounted on the punching ram 36 utilizing the loading system of the invention.

Figure 4:
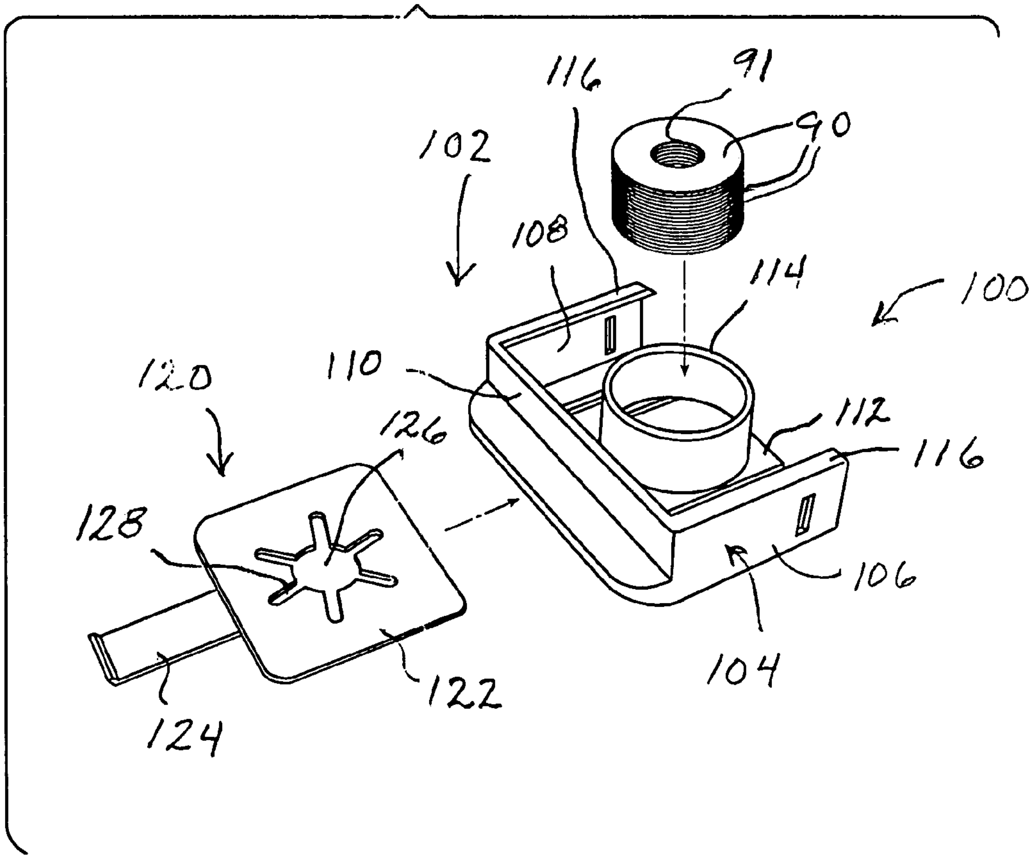
FIG. 4 is an exploded perspective view thereof showing the removable bottom panel withdrawn from the reinforcer loader body and a stack of reinforcing rings before insertion into the guide cylinder of the reinforcer loader body.

Each of the annular disc-shaped reinforcing rings 90 is formed of paper or plastic and each has an upper surface and a lower surface. A pressure-sensitive adhesive is applied to the lower surface of each of the reinforcing rings 90, while a release coating is applied to the upper surface of each of the reinforcing rings 90. As illustrated in FIG. 4, for example, the reinforcing rings 90 are stacked one above another. When the stack of reinforcing rings 90 is loaded according to the system of the present invention, the rings 90 are supported on the frustoconical shoulder 46 formed at the transition between the punching tip 40 and the shank 42 of the of the punching ram 36, as illustrated in FIG. 9.

The rigid, metal pressure plate 44 is a C-clip washer that is anchored to the shank 42 of the punching ram 36 a spaced distance above the punching tip 40. The C-clip pressure plate washer 44 fits into a radial groove in the punching ram shank 42 at a spaced distance above the punching tip 40 and has an outer diameter substantially equal to the outer diameter of the reinforcing rings 90. A rubber cushioning washer 72 is located between the C-clip pressure plate washer 44 and the stack of reinforcing rings 90. The reinforcing rings 90 beneath the cushioning washer 72 are coaxially mounted on the punching ram shank 42 and above the punching tip 40. The C-clip pressure plate washer 44 is secured to the punching ram shank 42 at a fixed distance above the punching tip 40 which will accommodate a full stack of reinforcing washers

90, preferably about one centimeter in axial length. The pressure plate 44 is thereby carried in reciprocal movement with the punching ram 36.

As illustrated in FIG. 1, the shelf 30 of the reinforcer loader support 26 projects forwardly from the tower 20 and has a pair of laterally spaced apart, outwardly projecting, fore and aft elongated ears 76 depending therefrom. The ears 76 of the reinforcer loader support 26 are configured to provide mounting attachments to receive a reinforcing ring loading and confining apparatus 100, illustrated in FIGS. 3-6. The reinforcing ring loading and confining apparatus 100 is comprised of a reinforcer loader 102 having a body portion 104 formed with upright side walls 106 and 108, an upright front wall 110, and a flat, horizontally disposed floor 112. The body portion 104 also includes a cylindrical, annular reinforcer guide 114 having an open top and an open bottom. The cylindrical reinforcer guide 114 projects upwardly from the surrounding floor 112.

The upright side walls 106 and 108 terminate at their upper extremities in a pair of narrow, laterally directed flanges 116 that project toward each other. The flanges 116 reside in sliding engagement atop the elongated ears 76 of the reinforcer loader support 26 when the reinforcing ring loading and confining apparatus 100 is attached to the reinforcer loader support 26, as illustrated in FIG. 2.

Figure 3:
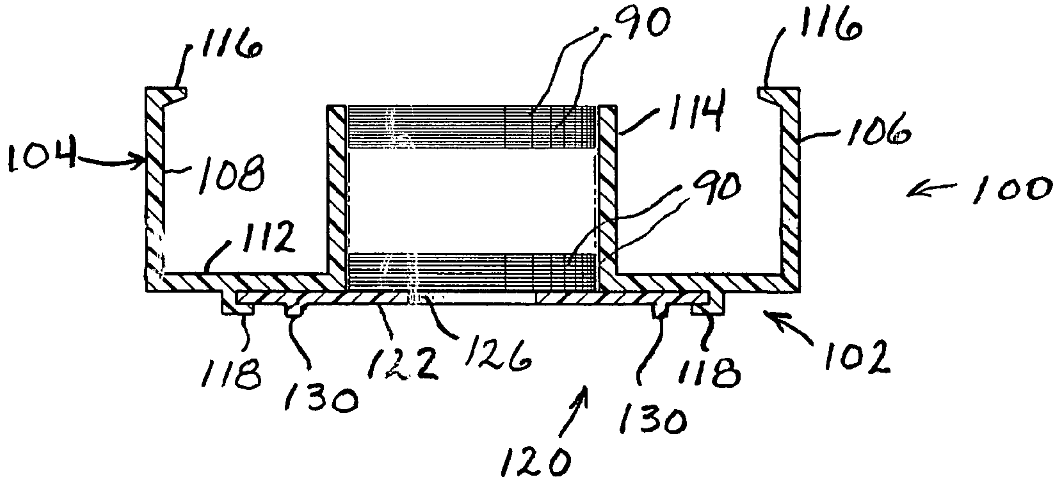
FIG. 3 is a front sectional view of a reinforcing ring loading and confining apparatus constructed according to the invention.
Figure 5:
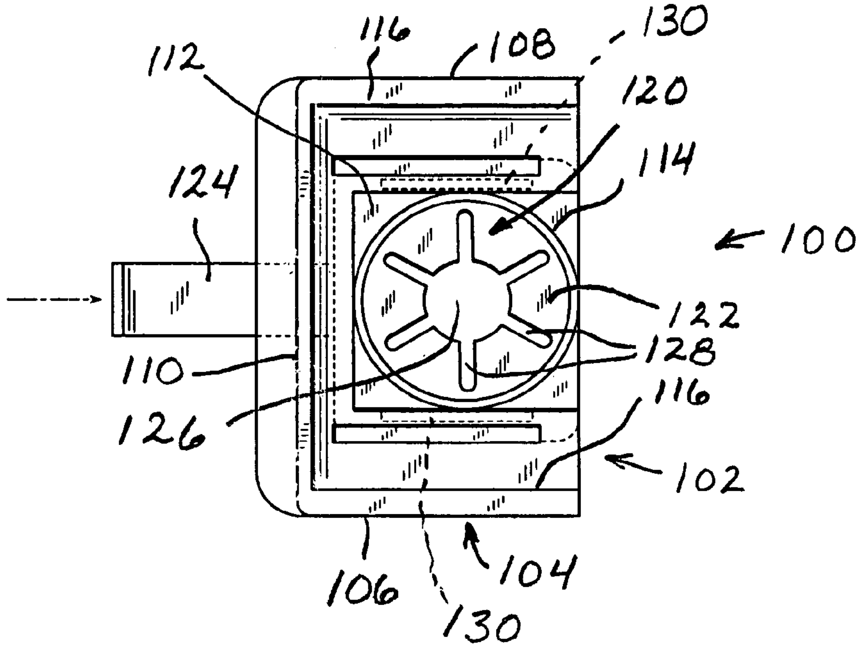
FIG. 5 is a top plan view of the reinforcer loader with the bottom panel inserted in position beneath the body portion thereof.
Figure 6:
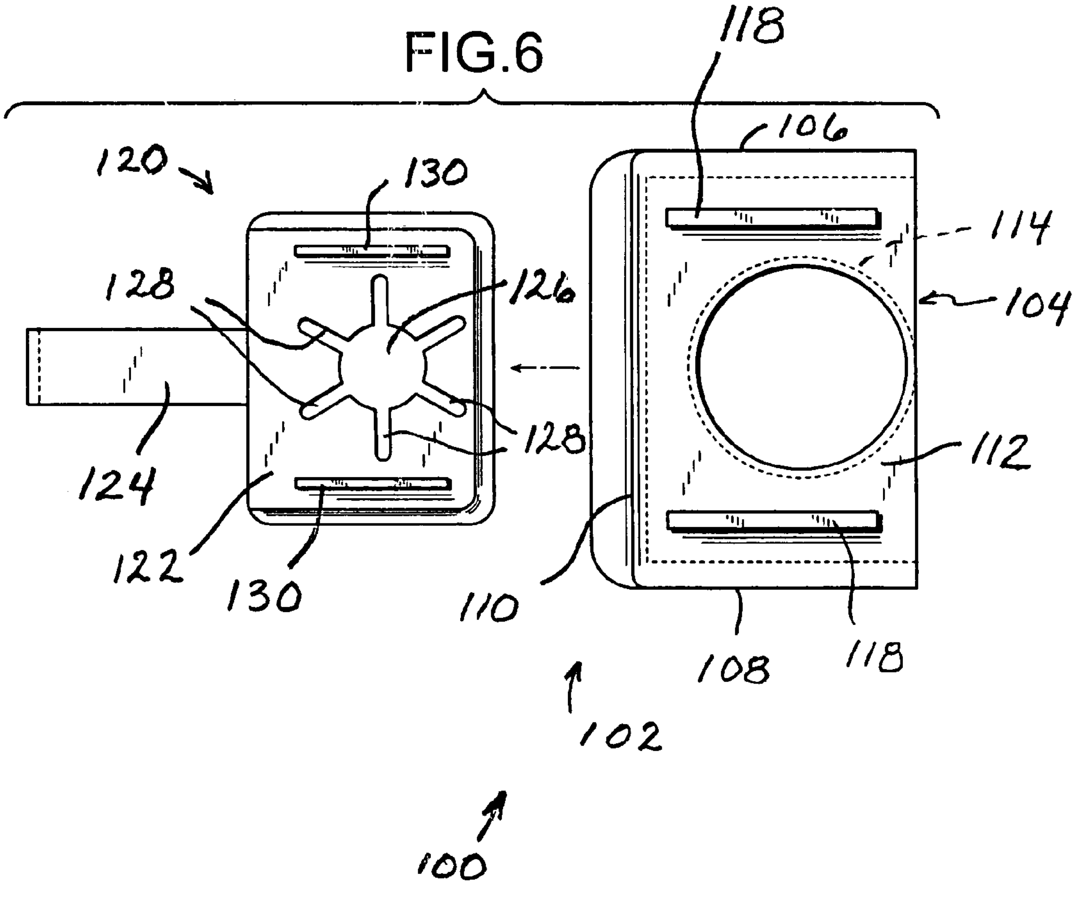
FIG. 6 is a bottom plan view illustrating the removable bottom panel withdrawn from the body portion of the reinforcer loader.

As illustrated in FIGS. 3, 5, and 6, the underside of the floor 112 of the body portion 104 is provided with a pair of laterally spaced ledges 118 for supporting a removable bottom panel 120 beneath the floor 112 in sliding engagement with the ledges 118. The bottom panel 120 has a generally rectangular-shaped slide plate 122 with a narrower, forwardly project pull tab 124. The rectangular portion 122 of the removable bottom panel 120 is disposed beneath the floor 112 of the body portion 104 with its lateral edges disposed in sliding engagement with the laterally spaced ledges 118, as illustrated in FIG. 3.

The rectangular portion 122 of the removable bottom panel 120 has a central, circular opening 126 therethrough with a plurality of slits 128 radiating therefrom. In the embodiment illustrated there are six slits 128 equally spaced to radiate from the periphery of the central, circular opening 126.

The rectangular portion 122 of the removable bottom panel 120 is supported from beneath by the ledges 118 and forms a reinforcing ring support mounted directly beneath the reinforcer loader floor 112 and below the bottom of the reinforcer guide cylinder 114. In this disposition the central, circular opening 126 through the removable bottom panel 120 is disposed in coaxial alignment with the circular opening through the guide 114 and with the axis 35 of the punching ram 36. With the removable bottom panel 120 in this supporting position relative to the body portion 104 of the reinforcer receptacle 102, the reinforcing ring loading and confining apparatus 100 is able to receive and support a stack of the reinforcing rings 90 within the guide 114, as illustrated in FIG. 3. The stack of reinforcing rings 90 is inserted into the top of the cylindrical reinforcer guide 114. Preferably the stack of reinforcing rings 90 extends approximately to the top of the cylindrical guide 114, as illustrated in FIG. 3.

Figure 7:
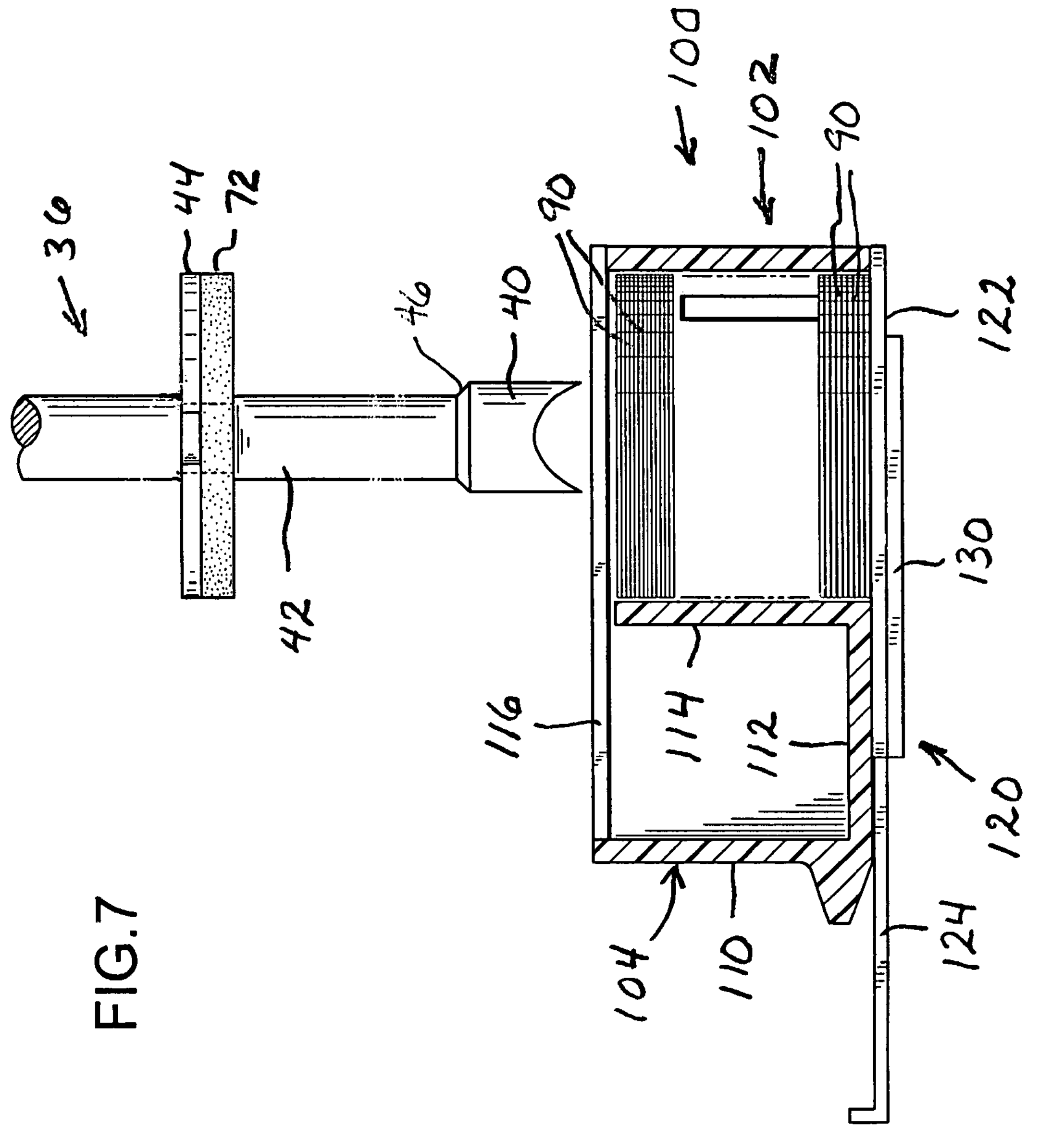
FIG. 7 is a right side elevational view that illustrates the initial step in loading a stack of reinforcing rings onto a punching ram in the machine of FIGS. 1 and 2 with the punching ram and reinforcer loader shown in isolation from the machine.

With the reinforcing rings 90 loaded into the reinforcing ring loading and confining apparatus 100, and with the removable bottom panel 120 fully inserted beneath the guide 114, as illustrated in FIG. 3, the reinforcing ring loading and confining apparatus 100 is engaged with the reinforcer loader support 126 by aligning the flanges 116 with the ears 76, and sliding the entire reinforcing ring loading and confining apparatus 100 into position beneath the hatch 70, as illustrated in FIG. 7. The reinforcing ring loading and confining apparatus 100 is thereupon positioned in the hole punching and sheet reinforcing machine 10 directly beneath the punching ram 36, as illustrated in FIG. 7.

The reinforcing rings 90 each have a center opening 91 just slightly smaller is cross-sectional area than the punching tip 40. The reinforcing rings 90 are stacked in vertical alignment atop each other and the stack of reinforcers 90 is initially seated atop the reinforcer support formed by the rectangular portion 122 of the removable bottom panel 120. The reinforcers 90 are thereby laterally confined within the reinforcer guide cylinder 114.

Figure 8:
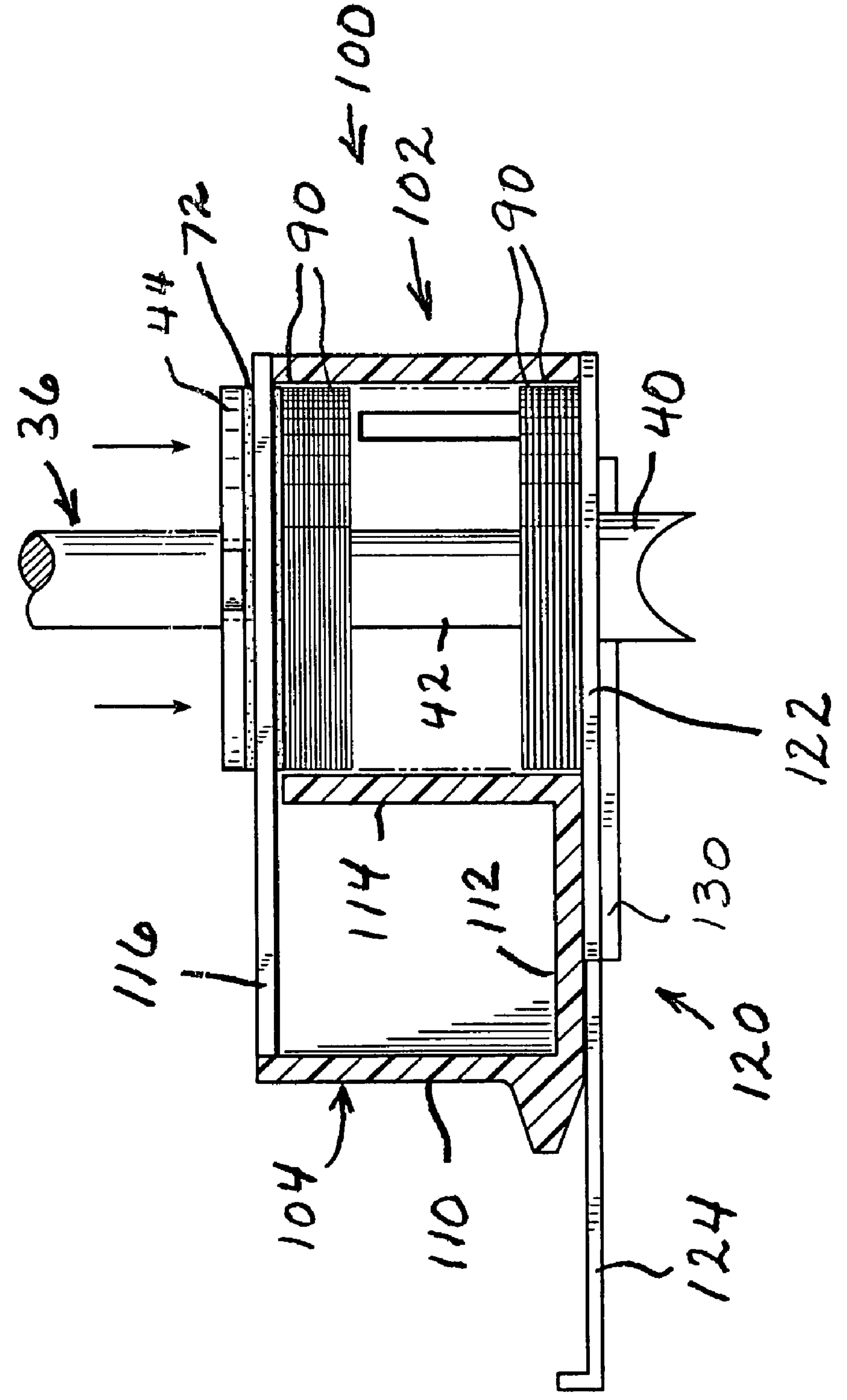
FIG. 8 illustrates the next step of insertion of the punching ram through the stack of reinforcing rings in the reinforcer loader of the invention.

The punching rams 36 are then operated by depressing the handle 66 to move the operating lever arms 60 downwardly in a clockwise rotational motion, as indicated in solid lines in FIG. 2. This downward force caused the pivot pins 54 to push the punching rams 36 downwardly and through the center openings 91 in the stack of reinforcing rings 90. Although the inner diameter of the center openings 91 of the reinforcement rings 90 is very slightly smaller than the diameter of the punching tip 40, the reinforcing rings 90 are constructed of a material sufficiently resilient to allow the punching tip 40 to be forced through all of the central openings 91 in the reinforcement rings 90. The punching tip 40 is thereby forced downwardly through the stack of reinforcing rings 90 so that the punching tip 40 passes through the central opening 126 in the rectangular portion 122 of the bottom panel 120, as illustrated in FIG. 8.

The radial slits 128 in the bottom panel 120 impart a sufficient flexibility to that structure so that the punching tip 40 can pass completely through the rectangular portion 122. However, the structure of the bottom panel 120 is stiff enough to prevent the annular reinforcing rings 90 from passing through the bottom panel 120. To the contrary, the underside of the rectangular portion 122 of the removable bottom panel 120 is provided with a pair of laterally spaced, fore and aft extending ribs 130. The ribs 130 form a plurality of depending protrusions that are located radially beyond the slits 128 radiating from the central opening 126 and serve to stabilize the edge of the structure of the rectangular portion 122 of the bottom panel 120 beneath the floor 112 of the body portion 104. The bottom panel 120 thereby resists bending beyond the radial slits 28 as the punching ram 36 is pushed downwardly and the punching tip 40 passes through the opening 126.

The downward pressure on the handle 66 is then removed, thereby allow the compressed coil spring 64 to force the lever arms 60 upwardly, thereby pulling the punching ram 36 back up into its retracted position, as indicated in phantom in FIG. 2 and also as illustrated in FIG. 9. As shown in FIG. 9, withdrawal of the punching tip 40 vertically upwardly causes the shoulder 46 to engage the stack of reinforcing rings 90 at their central openings 91 and thereby load the complete stack of reinforcing rings 90 onto the punching ram 36 with a single cycle of operation of the punching ram 36, as illustrated in FIG. 9. Upon retraction of the punching ram 36 upwardly, the stack of reinforcing rings 90 are carried upwardly disposed about the shank 42 of the punching ram 36. The plastic material forming the removable bottom panel 120 is formed of a sufficiently slick plastic so that the pressure-sensitive adhesive of the underside of the lowermost reinforcing ring 90 does not readily adhere to the upper surface of the rectangular portion 122 of the removable panel 120. The stack of reinforcing rings 90 is thereupon disposed atop the punching tip 40, supported by the shoulder 46.

Following retraction of the punching ram 36, the user then grips the pull tab 124 and draws it rearwardly in a horizontal direction, thereby sliding the edges of the rectangular portion

122 of the bottom panel 120 out of engagement with the ledges 118. The bottom panel 120 is thereby drawn free from the body portion 104 and is totally detached from the reinforcing ring loading and confining apparatus 100, as illustrated in FIG. 9.

With the bottom panel 120 removed from the body portion 104, the body portion 104 of the reinforcement loading and confining apparatus 100 remains in position while flat sheets of paper material 12 are inserted into the hole punching and reinforcing machine 10. The handle 66 is depressed each time a sheet of material 12 is inserted into the hole punching and reinforcing machine 10 atop the deck 22 and beneath the punching rams 36. The handle 66 is thereupon depressed, thereby concurrently punching holes 13 in each sheet of material 12 while pressing the pressure-sensitive adhesive coated underside of the lowermost reinforcing ring 90 down against the sheet of material 12, as illustrated in FIG. 10. The chads 134 created by the punching operation fall into the collection area in the removable tray 24.

Following punching of the holes 13 and securement of the lowermost reinforcing rings 90 from the punching rams 36 on the sheet of paper 12 about the openings 13 therein, downward force is removed from the handle 66. The removal of pressure from the handle 66 allows the compressed coil spring 64 to again retract the punching rams 36 upwardly, clear of the reinforcement loading and confining apparatus 100, as illustrated in FIG. 11. Also as shown in that drawing figure the adhesive strength of the pressure-sensitive adhesive on the underside of the lowermost reinforcing ring 90 causes that ring to remain in position, adhesively secured to the punched sheet of material 12. The release coating on the upper surface of the lowermost reinforcing ring 90 ensures that the adhesive strength of the pressure-sensitive adhesive coating on the underside of the reinforcing ring 90 located immediately thereabove is insufficient to prevent detachment of the lowermost reinforcing ring 90 from the remainder of the stack of reinforcing rings 90. The punched and reinforced sheet 12 is removed and the cycle is repeated.

The concurrent punching and reinforcing operation then proceeds as illustrated in FIGS. 10 and 11 until the entire supply of reinforcing rings 90 in the stack of reinforcing rings 90 in the ring loading and confining apparatus 100 is depleted. At this point, a new stack of reinforcing rings 90 is then inserted into the guide 114, as illustrated in FIG. 4, with the removable bottom panel 120 fully inserted beneath the guide 114 in the disposition illustrated in FIG. 7. The reinforcing ring loading operation depicted in FIGS. 7-9 is then repeated.

Undoubtedly, numerous variations and modifications of the invention will become readily apparent to those familiar with combination hole puncher and sheet reinforcer devices. For example, the removable bottom panel 120 could be hinged to the back edge of the body portion 104, rather than configured as a detachable sliding device. Other features of the embodiment illustrated may also be modified. Accordingly, the scope of the invention should not be construed as limited to the specific embodiment illustrated and the implementation of the method described, but rather is defined in the claims appended hereto.

I claim:

1. In a combination hole puncher and sheet material reinforcer machine for punching holes in sheets of material while concurrently attaching annular reinforcing rings thereto employing a punching ram including a shank with a pressure plate secured thereto and a punching tip having a greater cross-sectional area than said shank, and a deck beneath said punching ram having an aperture therethrough coaxially aligned with said punching ram wherein said punching ram is movable in a direction perpendicular to said deck between a retracted position remote therefrom and a punching position with said punching tip projecting through said aperture in said deck, the improvement comprising a reinforcer loader support mounted above said deck in spaced separation therefrom and defining a loading hatch therein larger in cross-sectional area than said annular reinforcing rings and surrounding said punching ram and said reinforcer support defines a reinforcer loader receptacle, a reinforcer loader including a body portion that fits into said reinforcer loader receptacle and which has a floor and a reinforcer guide cylinder open at both its top and bottom and projecting up from said reinforcer loader floor, and a reinforcing ring support mounted directly beneath said reinforcer loader floor below said open bottom of said reinforcer guide cylinder and removable from beneath said reinforcer loader floor, and a plurality of reinforcing rings, each having a center opening smaller in cross-sectional area than said punching tip, stacked in vertical alignment atop each other, wherein said stack of reinforcing rings is initially seated atop said reinforcing ring support and laterally confined within said reinforcer guide cylinder.

2. A combination according to claim 1 wherein said reinforcing ring support has a central opening therethrough coaxially aligned with of said punching ram.

3. A combination according to claim 1 wherein said reinforcing ring support has a circular central opening therethrough with a plurality of radial slits emanating therefrom.

4. A combination according to claim 3 wherein said reinforcing ring support has a plurality of depending protrusions located beyond said radial slits.

5. A combination according to claim 1 wherein said reinforcing ring support has a pull tab projecting forwardly therefrom and a pair of mutually parallel side edges, and said floor beneath said body portion has a pair of laterally spaced ledges for supporting said reinforcing ring support from beneath, whereby said removable reinforcing ring support is disposed in sliding engagement with said laterally spaced ledges.

6. A combination according to claim 1 wherein said reinforcer loader support is comprised of a forwardly projecting shelf with a pair of laterally spaced apart, outwardly projecting, elongated ears depending therefrom, and said reinforcer loader has upright side walls terminating in laterally directed flanges projecting toward each other, and said flanges reside in sliding engagement atop said elongated ears, whereby said flanges slidably engage said ears for movement in a fore and aft direction to allow said reinforcer loader to slide forward for detachment from said reinforcer loader support and alternatively, to slide rearward into engagement with said reinforcer loader support with said loading hatch centered beneath said punching ram.

7. A combination according to claim 1 further wherein said reinforcer loader support is secured relative to and extends upwardly from said deck and further comprising:

a punch mounting tower located rearwardly from said reinforcer loader support and including a pair of upright standards with a punch guide disposed therebetween and defining a punch guide path of punching ram travel oriented perpendicular to said deck and through said loading hatch, a bell crank mechanism mounted to said punch mounting tower at a bell crank mounting hinge connection located rearwardly from said punch guide and having a punch hinge connection to said shank of said punching ram located directly above said punch guide and having an operating arm hinge connection located rearwardly from said punch hinge connection and forwardly from said mounting hinge connection, an operating arm coupled to said punch mounting tower at an operating arm mounting hinge connection located forwardly of said punching ram and extending upwardly and rearwardly therefrom and coupled to said bell crank mechanism at said operating arm hinge connection, and a spring biasing mechanism urging said punching ram upwardly and away from said deck.

8. A method of loading a combination hole punching and sheet material reinforcing machine that has a punching ram for punching holes in said sheet material and which includes a shank: with a pressure plate secured thereto and a punching tip with a greater cross-sectional area than said shank, utilizing a reinforcer loader that has a body portion with a floor and a cylindrical reinforcer guide having an open top and an open bottom and rising from said floor, and a removable bottom panel mounted to said body portion beneath said floor and beneath said open bottom of said reinforcer guide, wherein said bottom panel defines a central opening therethrough, the steps comprising:

inserting into said top of said cylindrical reinforcer guide a stack of vertically aligned reinforcing rings, each having an upper surface with a release coating thereon and an under surface with a pressure-sensitive adhesive coating thereon, supporting said stack of annular reinforcing rings by said bottom panel of said reinforcer loader, positioning said reinforcer loader in said hole punching and sheet material reinforcing machine directly beneath said punching ram, operating said punching ram to push it downwardly and through said stack of reinforcing rings and so that said punching tip passes through said central opening is said bottom panel, retracting said punching ram upwardly thereby carrying said stack of reinforcing rings upwardly, disposed about said shank of said punching ram and atop said punching tip, and removing said bottom panel from said body portion of said reinforcer loader.

9. A method according to claim 8 wherein said bottom panel is provided with a tab projecting forwardly and away from said central opening therein, wherein removal of said bottom panel is performed by pulling said tab forwardly to pull said bottom panel completely free from said reinforcer loader.

10. A method according to claim 9 wherein said hole punching and sheet material reinforcing machine is equipped with a reinforcer loader support aligned with said punching ram and said reinforcer loader support includes mutually parallel ears located on opposite sides of said punching ram and projecting forwardly therefrom and said reinforcer loader is provided with mutually parallel flanges configured to cooperate with said ears in sliding engagement therewith, whereby said reinforcer loader is positioned in said hole punching and sheet material reinforcing machine by engaging said flanges with said ears and sliding said reinforcer loader rearwardly to a location beneath said punching ram.

* * * * *